United States Patent
Knibbe et al.

(10) Patent No.: US 8,729,808 B2
(45) Date of Patent: May 20, 2014

(54) COMMISSIONING CODED LIGHT SOURCES

(75) Inventors: Engel Johannes Knibbe, Heeze (NL); Lorenzo Feri, Eindhoven (NL); Tim Corneel Wilhelmus Schenk, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 97 days.

(21) Appl. No.: 13/501,546

(22) PCT Filed: Oct. 21, 2010

(86) PCT No.: PCT/IB2010/054776
§ 371 (c)(1),
(2), (4) Date: Apr. 12, 2012

(87) PCT Pub. No.: WO2011/051865
PCT Pub. Date: May 5, 2011

(65) Prior Publication Data
US 2012/0200226 A1 Aug. 9, 2012

(30) Foreign Application Priority Data
Oct. 28, 2009 (EP) .................... 09174347

(51) Int. Cl.
*H05B 37/02* (2006.01)
(52) U.S. Cl.
USPC .......................................... 315/151

(58) Field of Classification Search
None
See application file for complete search history.

(56) References Cited

U.S. PATENT DOCUMENTS

| 6,504,633 | B1 | 1/2003 | Hovorka et al. | |
|---|---|---|---|---|
| 7,619,508 | B2 * | 11/2009 | Lynam et al. | 340/438 |
| 2008/0203928 | A1 * | 8/2008 | Frumau et al. | 315/151 |
| 2008/0212981 | A1 | 9/2008 | Yamada et al. | |
| 2009/0041476 | A1 | 2/2009 | Ann et al. | |

FOREIGN PATENT DOCUMENTS

| WO | 2003007665 A1 | 1/2003 |
|---|---|---|
| WO | 2006065616 A2 | 6/2006 |
| WO | 2008065607 A2 | 6/2008 |
| WO | 2008139360 A1 | 11/2008 |

* cited by examiner

*Primary Examiner* — Crystal L Hammond
(74) *Attorney, Agent, or Firm* — Mark L. Beloborodov; John F. Salazar

(57) ABSTRACT

Commissioning a coded light source in a lighting system is accomplished by using a remote controller. When an identification of a light source is successful, a control message is sent to that light source to at least partly switch off its light emission. Thus the light contribution of the identified light source is suppressed. Thereby the chance of coded light from an already identified light source colliding with identifiers comprised in coded light emitted by other light sources is reduced. When no more coded light is detectable, a sensitivity of the remote controller can be increased until coded light again is detectable. Further light sources can then be identified and commissioned.

14 Claims, 4 Drawing Sheets

Legend:

Identifier for light source 1

Identifier for light source 2

Identifier for light source 3

Identifier for light source 4

COMMISSIONING CODED LIGHT SOURCES

FIELD OF THE INVENTION

The present invention relates to commissioning a light source. Particularly it relates to methods and devices for commissioning a light source in a lighting system comprising a plurality of light sources capable of emitting coded light.

BACKGROUND OF THE INVENTION

The use of optical free space communications, i.e. visible light (VL) and infra-red (IR) communications, for the selection and advanced control of light sources has previously been proposed, and will be referred to as coded light (CL). For the transmission of CL, mostly, light emitting diodes (LEDs) are considered as light sources in the luminaires, which allow for a reasonable high modulation bandwidth. This in turn may result in a fast response of the resulting control system. Although LEDs are typically considered, other light sources (incandescent, halogen, fluorescent and high-intensity discharge (HID) lamps) also enable the embedding of identifiers in the light, generally, however, at a lower rate.

CL can be used to embed unique identifiers, or codes, in the light output of different light sources. Using these identifiers the light emanating from a specific light source can be identified in the presence of illumination contributions from other light sources. This identification of the individual illumination contributions allows for applications such as light source selection, point and control, commissioning and interactive scene setting. These applications have use in, for example, homes, offices, shops, cars, and hospitals. These light source identifiers enable a simple and intuitive control operation of a light system, which might otherwise be very complex.

One specific category of applications that CL enables is room-based auto-commissioning. In this application a control device receives modulated light from various luminaires in the room. After extracting the identification codes from the modulated light the control device creates a (wireless) link to the luminaires identified allowing it to control them. This establishing of the binding and the control relation is what hereinafter will be referred to as commissioning.

The sensitivity of the control device forms a practical problem, especially for the luminaires situated remote from the location of the control device. These luminaires only provide a small contribution to the light received by the control device, making it difficult to successfully extract their identifiers. Furthermore, if the individual luminaires emit their identification in a random access fashion (e.g. via the framed ALOHA protocol), many collisions may occur before an identification code is extracted correctly.

SUMMARY OF THE INVENTION

It is an object of the present invention to overcome this problem, and to provide means for improved commissioning of light sources. It is a particular objective to provide means for commissioning of light sources where coded light as received by a light detector comprises identifiers associated with a plurality of light intensities.

Generally, the above objectives are achieved by a remote controller according to the attached independent claim.

According to a first aspect of the invention, this and other objects are achieved by a remote controller for commissioning a light source in a coded lighting system comprising a plurality of light sources capable of emitting coded light, comprising: a light detector; a processing unit coupled to the light detector and arranged to determine an identifier of the light source based on light detected by the light detector, thereby identifying the light source; and a transmitter arranged to transmit a command to the identified light source to at least partly switch off its light emission; and wherein the processing unit is arranged to instruct the transmitter to transmit the command in response to identifying the light source, thereby commissioning the light source.

Advantageously, the inventive auto-commissioning method allows the commissioning process to be performed in a limited time period, avoiding the many collisions of signals present in the prior art. The method allows commissioning the light sources of luminaires located closest to the remote control device (i.e. those giving the strongest signal) first, before turning to the others. In other words, when the light emission of the identified light source is at least partly switched off its light contribution is reduced, thereby reducing the risk of collision with identifiers of other light sources. On average, the light sources close by will be first identified.

The remote controller may further comprise a variable gain amplifier coupled to the light detector and arranged to decrease a sensitivity of the light detector until at most one identifier is detectable in the received light. With a small amplification gain, the distant light sources will produce signal contributions that are hidden in the quantization noise and are hence not detectable. Thereby only the light sources close by are detectable.

The remote controller may further comprise a variable gain amplifier coupled to the light detector and arranged to increase a sensitivity of the light detector until at least one identifier is detectable in the received light. Advantageously the sensitivity can be increased if no light source identifiers are detectable. Thereby the chance of detecting a light source may increase.

Even though the already identified light sources have dimmed the light emission it may still interfere with light sources associated with weak intensities. The remote controller may therefore further comprise a memory coupled to the processing unit and arranged to store identifiers of the plurality of light sources; wherein the processing unit is arranged to, during determination of the identifier of the light source, compare the identifier of the light source with the stored identifiers of previously identified light sources; and wherein the memory is arranged to add the identifier of the identified light source to the memory in response to the identified light source having been identified. Advantageously the remote controller may thereby reduce the risk of identifying the same light source twice.

The remote controller may be arranged to successively increase the sensitivity of the light detector, thereby enabling the processing unit to successively identify light sources one by one; and wherein the memory is arranged to store the identifiers of the successively identified light sources one by one into the memory in response to the successively identified light source having been identified. Hence such a remote controller may enable effective and successive identification of light sources one by one in a coded lighting system.

The remote controller may be arranged to transmit, to the identified light source, a further command pertaining to control of a light property of the identified light source, wherein an influence of the control is dependent on at least one from a group of (i) an intensity level, and (ii) an angle of entry of the detected light associated with the identified light source. The transmitter may be arranged to transmit the further command in case the intensity level is higher than a predetermined threshold and/or the angle of entry is within a predetermined interval. Advantageously the remote controller may thereby be able to exclusively control light sources within a predefined distance range from the remote controller.

The remote controller may be limited to control a subset of light sources in the plurality of light sources in the coded lighting system; and wherein the transmitter is arranged to transmit the further command exclusively in case the identified light source is comprised in the subset. Advantageously the remote controller may thereby be able to exclusively control a predefined number of light sources. These light sources may correspond to the first detected light sources. These first detected light sources may correspond to light sources being located within a predefined distance range from the remote controller.

The processing unit may comprise a communications interface coupled to the processing unit, whereby the remote controller is capable of communicating information pertaining to identification of light sources to and/or from at least a second remote controller. Advantageously this enables the remote controller to exchange information with at least a second remote controller. By utilizing this information the commissioning may be improved e.g. by improving the reliability of the identification.

According to a second aspect, the above objects are achieved by a method for commissioning a light source in a coded lighting system, comprising the steps of: emitting coded light from the light source; detecting light by a remote controller; determining, by the remote controller, an identifier of the light source based on the detected light, thereby identifying the light source; and transmitting, by the remote controller, a command to the identified light source to at least partly switch off its light emission, wherein the command is transmitted in response to identifying the light source, thereby commissioning the light source.

Generally, the features and advantages of the first aspect are also applicable to the second aspect. It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

DETAILED DESCRIPTION

The below embodiments are provided by way of example so that this disclosure will be thorough and complete, and will fully convey the scope of the invention to those skilled in the art. Like numbers refer to like elements throughout.

Figure 1:
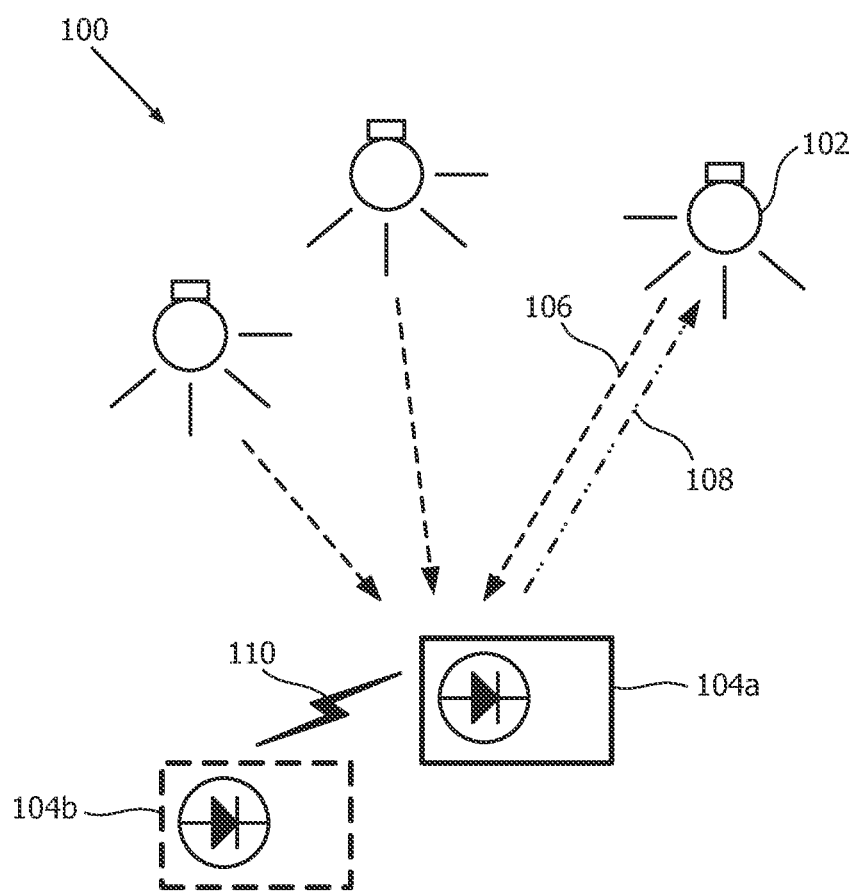
FIG. 1 is a lighting system according to an embodiment.

FIG. 1 illustrates a lighting system 100 comprising at least one light source, schematically denoted by the reference numeral 102. The light source 102 may be part of a lighting control system, thus the lighting system 100 may be denoted as a coded lighting system. It should be noted that the term "light source" means a device that is used for providing light in a room, for purpose of illuminating objects in the room. Examples of such light providing devices include lighting devices and luminaires. A room is in this context typically an apartment room or an office room, a gym hall, a car, a room in a public place or a part of an outdoor environment, such as a part of a street. Each light source 102 is capable of emitting light, as schematically illustrated by the arrow 106.

Due to the large number of light sources 102, the distance between the light sources 102, and the broad range of illumination levels that can be supported by each light source 102, the complexity to calibrate and control such a lighting system 100 is quite high. According to state-of-the-art techniques only a small number light sources 102 can be commissioned in a lighting system 100 based on coded lighting within a limited amount of time. This and other problems can be overcome by methods, devices and system concepts as disclosed below which improves the commissioning of light sources 102 in the lighting system 100 by improving detection of identifiers and control of the light sources 102.

The emitted light comprises a modulated part associated with coded light comprising a light source identifier. A method for commissioning a light source will be disclosed below. The emitted light may also comprise an un-modulated part associated with an illumination contribution. Each light source 102 may be associated with a number of lighting settings, inter alia pertaining to the illumination contribution of the light source, such as color, color temperature, dimming level and intensity of the emitted light. In general terms the illumination contribution of the light source may be defined as a time-averaged output of the light emitted by the light source 102.

The lighting system 100 further comprises one or more remote controllers 104a, 104b, for detecting, receiving and processing light, such as the coded light comprising the light source identifier emitted by the light source 102 as well as the light emitted by light sources outside the lighting system 100 (not shown). Thus coded light signals can not only be emitted by luminaires or light sources, but also by other devices like sensors, switches, and other climate devices such as air conditioning units, blind controllers, ventilation units, thermostats and heating units (e.g. using a white, IR or other color LED). In this way also these devices can be found and linked to the lighting system 100.

With reference to FIG. 1, a user may want to control a light source 102 in the lighting system 100 by using the remote controller 104a, 104b. Therefore, first the light source, and the possibly connected other device, needs to be commissioned. To this end, the light sources 102 emit a unique identifier via the visible light 106. The remote controller 104a, 104b has a (directional optical) light sensor, which can distinguish the light contributions of the different light sources and select the relevant light source 102. This light source 102 may then be controlled over a communications link, for example a radio frequency link 108, e.g. based on ZigBee.

The user may also want to control light sources 102 in the lighting system 100 in order to create light in a certain position and/or with a required intensity and/or light color. To this end, the light sources 102 emit a unique identifier via the visible light 106. The remote controller 104a, 104b has a light receiver, and is able to distinguish and estimate the magnitude of the light contributions of the different light sources 102 in that location. The remote controller 104a, 104b can then estimate the required contributions of the identified light sources 102 and communicate the new light setting to the light sources 102, as indicated by arrow 108 in FIG. 1. Further, as indicated by reference numeral 110 information processed by an individual remote controller 104a may be communicated to another individual remote controller 104b.

In the above scenarios practical problems include the sensitivity of the remote controller 104a, 104b in order to be able to detect all the light sources 102 in the room. Particularly, for luminaires that are located further away, only a small contribution of the emitted light reaches the detector of the remote controller 104a, 104b. Further, the individual luminaires emit their identification in a framed ALOHA fashion. According to the random access nature of ALOHA-like protocols each light source 102 sends its identifier at a certain point in time in each time slot. This point in time is randomized from time slot to time slot. This means that collisions can occur before an identification is received correctly. Because of the capture effect, strongly received packets might be recovered from the collisions, but it will be more difficult, if not impossible, to identify light sources located further away.

In room based auto-commissioning according to the present invention the remote controller 104a, 104b receives the modulated light from the various luminaires in a room, detects the identification of the luminaires from the modulated light emitted by the luminaires' light sources 102, and creates a (wireless) link to these luminaires that allows the controller to control them.

Figure 2:
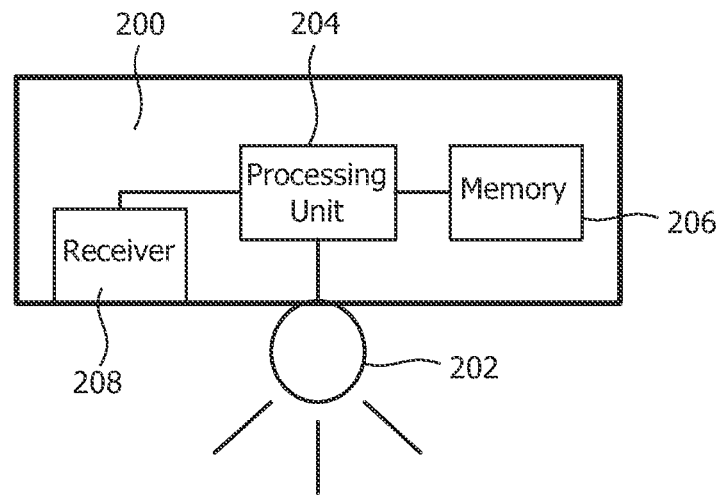
FIG. 2 is a light source according to an embodiment.

FIG. 2 schematically illustrates a functional block diagrams of a light source 200, such as the light source 102 of FIG. 1 disclosed above. The light source 200 may thus be configured to emit illumination light as well as coded light, wherein the coded light comprises a light source identifier of the light source 200. The light source 200 may have been provided with identifiers during manufacturing. The identifier may correspond to a MAC address of the light source. The MAC address may be in the order of 32 to 64 bits long. The light source 200 comprises an emitter 202 for emitting the coded light. The emitter 202 may comprise one or more LEDs, but it could as well comprise one or more FL or HID sources, etc. When an additional light emitter is used for the identification, e.g. an IR LED, this light emitter will be placed in proximity of the primary light emitter. The primary light emitter is associated with the illumination function of the light source (i.e. for emitting the illumination light) and can be any light emitter, and the secondary light emitter is associated with the light source identifier (i.e. for emitting the coded light). Preferably this secondary light emitter is a LED. Thus, in some embodiments the emitter 202 comprises a primary light emitter for illumination purposes and a secondary light emitter for sending coded light. In some embodiment a single light emitter constitutes both the primary and the secondary light emitter. The light source 200 further comprises a receiver 208 for receiving information pertaining to a setting of the light source 200. The setting may relate to color, color temperature, dim level and intensity of the light emitted by the light source 200. The light source 200 may further comprise other components such as a processing unit 204 such as a central processing unit (CPU) and a memory 206. By e.g. utilizing the processing unit 204 the light source 200 may change the settings of the emitted light. Information pertaining to the identifiers, such as identifiers and code parameters may be stored in the memory 206.

Luminaires (not shown) may comprise at least one light source 200, wherein each light source may be assigned individual and unique light source identifiers. Preferably this light source is a LED-based light source.

Figure 3:
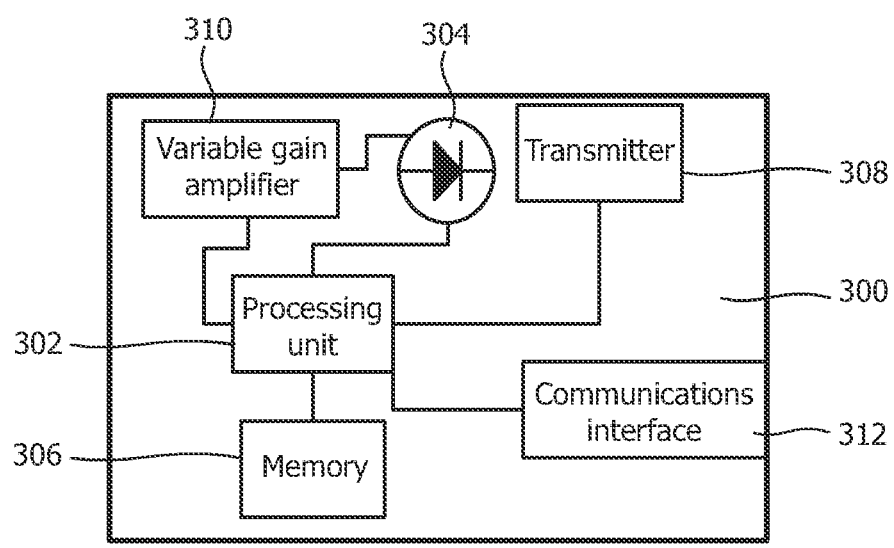
FIG. 3 is a remote controller according to an embodiment.

A functional block diagram for a remote controller 300, such as the remote controller 104a, 104b of FIG. 1, is given in FIG. 3. The remote controller 300 comprises a processing unit, schematically illustrated by reference numeral 302, arranged to commission a light source 102, 200 based on light detected by a light detector 304 of the receiver 300. In order to achieve such commissioning the remote controller 300 is arranged to perform a number of functionalities. These functionalities will be described below with reference to the flowchart of FIG. 4. The remote controller 300 further comprises a memory 306, a transmitter 308, a variable gain amplifier 310, and a communications interface 312. The memory 306 may store instructions pertaining to the functionalities to commissioning a light source 102, 200. The memory 306 may further store identifiers of the plurality of light sources. The transmitter 308 may be utilized in order to communicate the commissioning to light sources 102 in lighting system 100. The variable gain amplifier 310 may be used to increase or decrease the sensitivity of the light detector 304. The communications interface 312 may be used to enable the remote controller 300 to communicate with other remote controllers or with a master controller of the lighting system 100. The remote controller 300 may be a desk mounted device with an omni-directional light detector 304. This remote controller 300 can have either a wired or wireless link (e.g. ZigBee) to the luminaires.

Figure 4:
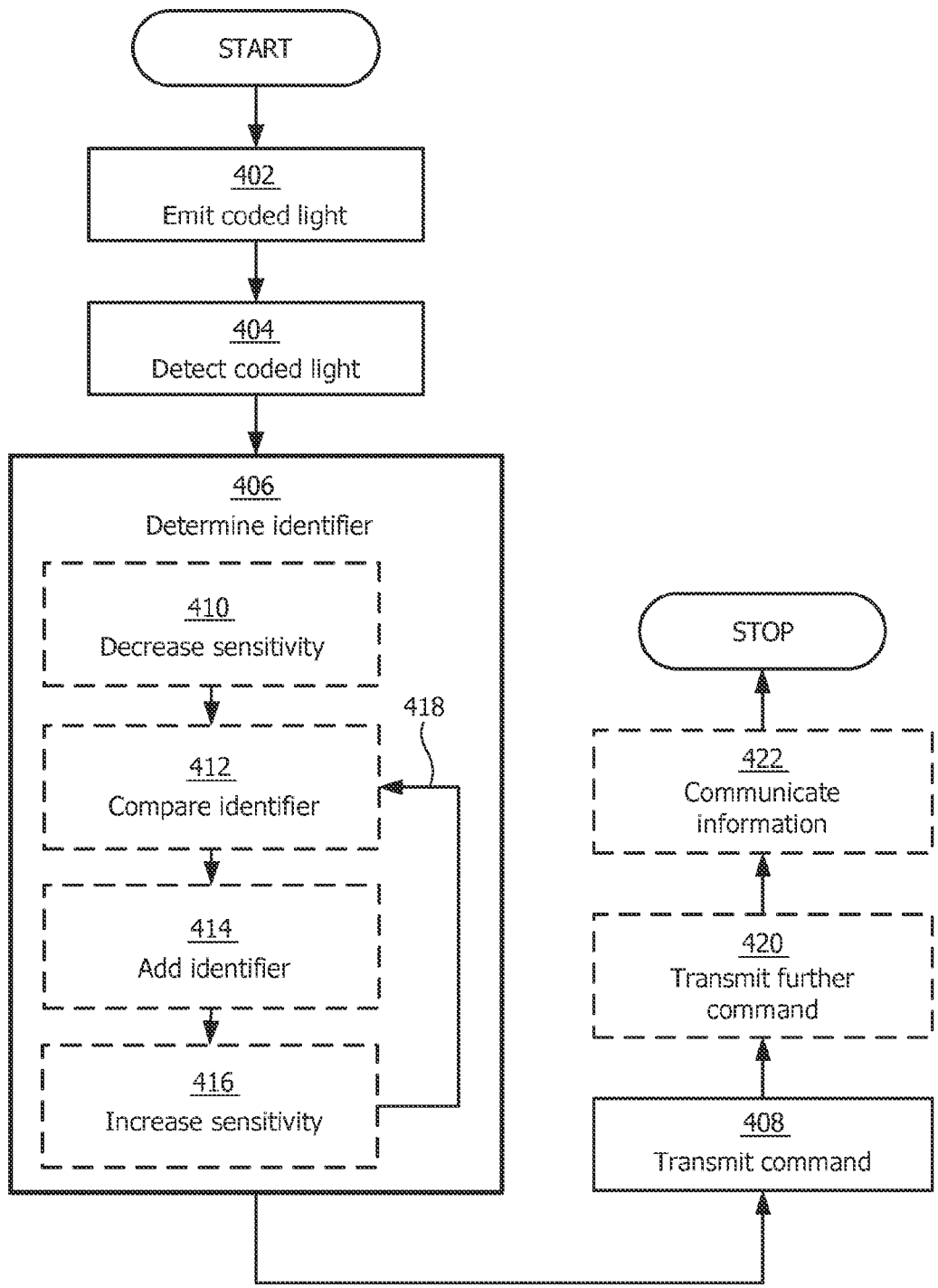
FIG. 4 is a flowchart according to embodiments.

A method for commissioning light sources 102, 200 in a coded lighting system 100 will now be described with reference to the flowchart of FIG. 4. The luminaires, or the light sources 102, 200 comprised in the luminaires, are put into commissioning mode by a general command to emit coded light. Alternatively the luminaires might emit their identification at all times when they emit light, until they are commissioned. Thus, in a step 402, coded light is emitted from at least one light source 102, 200 in the coded light system 100.

Light comprising the coded light emitted from at least one light source 102, 200 is detected by the light detector 304 of the remote controller 104a, 104b, 300, step 404. It is noted that the received light may also comprise illumination contribution from light sources not part of the coded lighting system 100.

The remote controller 104a, 104b, 300 determines an identifier of one light source 102 based on the detected light, step 406. The light source 102, 200 is thereby identified.

If the coded lighting system 100 comprises a large number of light sources 102 it may be difficult to correctly identify each and every one of the light sources 102. Particularly since the chance of collisions according to the ALOHA protocol increases with the number of light sources. The variable gain amplifier 310 of the remote controller 104a, 104b, 300 may therefore be utilized such that the light sources 102 may be correctly identified one by one. Particularly, if the sensitivity of the light detector 304 is too high it may be difficult to distinguish one identifier from another. Therefore the variable gain amplifier 310 may be arranged to decrease, in a step 410, a sensitivity of the light detector 304 until at most one identifier is detectable in the received light. The at most one identifier may correspond to a light source 102 emitting coded light with higher intensity in comparison to the other light sources in the coded lighting system 100. The at most one identifier may also correspond to a light source 102 having a smallest distance to the remote controller 104a, 104b in comparison to the other light sources in the coded lighting system 100. Similarly, if the sensitivity of the light detector 304 is too low none of the identifiers may be detectable. Therefore the variable gain amplifier 310 may be arranged to increase a sensitivity of the light detector until at least one identifier is detectable in the received light.

The processing unit 302 may be arranged to, during determination of the identifier of the light source, in a step 412, compare the identifier of the light source 102 to be identified with identifiers of previously identified light sources. Such a comparison can be made possible since the identifiers of previously identified light sources may be stored in the memory 306 of the remote controller 300. By making such a comparison the remote controller 104a, 104b, 300 may thereby avoid the risk of (incorrectly) identifying the same light source twice. Once the light source 102 has been identified the identifier of the identified light source 102 may be added, in a step 414, to the memory 306 such that the identifier of the identified light source 102 may be utilized in future comparisons.

In case the sensitivity of the light detector 304 has been decreased until at most one identifier is detectable in the received light and that identifier has been correctly identified (and stored in the memory 306) the received light does not comprise any undetected and unidentified identifiers any more. Therefore the remote controller 300 may be arranged to, in a step 416, successively increase the sensitivity of the light detector 304 by using the variable gain amplifier 310. Particularly, the sensitivity of the light detector 304 may be increased until another (unidentified) identifier is detectable in the received light. Thereby the processing unit 302 may successively identify the light sources 102 in the coded lighting system 100 one by one. Thus the memory 306 may be arranged to store the identifiers of the successively identified light sources 102 one by one in the memory 306 in response to the successively identified light sources 102 having been identified. This may, in other words, enable an iterative process for commissioning light sources 102 in a coded lighting system 100, as schematically noted by the reference numeral 418.

According to an embodiment the processing unit 304 may be arranged to determine the identifier of the identified light source 102 by first detecting non-colliding identifier packets of the plurality of light sources 102 within a time frame, e.g. based on a piece of training data in every identifier packet. Subsequently, the data in the packet is decoded to detect the identifier.

The remote controller 104a, 104b, 300 then transmits a command to the identified light source 102, step 408. The command comprises instructions for the identified light source 102 to at least partly switch off its light emission. The command is transmitted in direct response to the light source 102 having been identified by the remote controller 104a, 104b, 300. Thereby the light source 102 is commissioned. Thus the transmission of the command is part of the commissioning process and as such not dependent on a particular user input. The command transmitted to the identified light source 102 to at least partly switch off the light emission of the identified light source 102 can thus not be compared to a general user initiated command to at least partly switch off the light emission of a light source 102 in the lighting system 100.

According to embodiments of the present inventions there may be different ways to at least partly switch off the light emission of the identified light source 102. For example, the command may comprise information to switch off only a modulated part of the light emitted by the identified light source 102. The modulated part of the emitted light comprises the identifier of the light source 102. Thereby the modulated part of an already identified light source 102 cannot interfere with identifiers of light sources which have not been identified yet. By only switching of the modulated part of the emitted light the light source 102 may be able to continue the emission of (non-modulated) light. Thereby the light source 102 does not need to be completely switched off. This may be suitable for a light detector which is mainly sensitive to modulated signals. Alternatively, the remote controller 104a, 104b, 300 may be placed such that it only receives the modulated part of the light emitted by the light sources 102. For example, the remote controller 104a, 104b, 300 may be mounted in the ceiling of a room, thereby receiving modulated light reflected by furniture, walls or the floor of the room. As a second example, the command comprises information to dim the light emission of the identified light source 102. According to an embodiment only the modulated part of the emitted light is dimmed. Thereby the risk of the modulated part interfering with identifiers of light sources which have not been identified yet is reduced. According to an embodiment the entire light emission of the identified light source 102 is dimmed. Such an embodiment may provide a user with visual feedback that a light source 102 has been successfully identified. As a third example the command comprises information to switch off the entire light emission of the identified light source 102. Such a complete shut-down may be advantageous if the identified light source 102 is located close to the remote controller 1041, 104b, 300 and thereby dominates the light contribution of the light received by the light detector 304 of the remote controller 104a, 104b, 300.

The remote controller 104a, 104b, 300 may be arranged to transmit a further command to the identified light source 102, step 420. The command may pertain to the control of a light property of the identified light source 102, such as color, color temperature, dim level and intensity of the light emitted by the identified light source 102.

According to embodiments the influence of the control is dependent on properties of the light emitted by the identified light source 102 as received by the light detector 304. For example, the influence of the control may be dependent on the intensity level of the detected light associated with the identified light source 102. In general, the influence of the control may be proportional to the intensity level of the received light; a higher intensity level may be associated with a higher control influence than a lower intensity level. The rationale behind this reasoning is that it is likely that a high intensity level is associated with a light source 102 located in close vicinity to the remote controller 104a, 104b, 300. Hence the remote controller 104a, 104b, 300 should be able to have a higher influence of the control of light sources 102 located relatively close to the remote controller 104a, 104b, 300 than of light sources located relatively far from the remote controller 104a, 104b, 300. Particularly, the transmitter 308 may be arranged to transmit the further command in a case the intensity level is higher than a predetermined threshold. In other words, in case all light sources emit light at substantially identical intensity level the remote controller 104a, 104b, 300 may only influence control of light sources located within a predefined radius of the remote controller 104a, 104b, 300, where the radius is defined by the corresponding predetermined intensity threshold. As a second example the influence of the control may be dependent on an angle of entry of the detected light associated with the identified light source. 102.

Particularly, the transmitter 308 may be arranged to transmit the further command in a case the angle of entry is within a predetermined interval. The predetermined interval may, for example, be associated with an angle of entry corresponding to a light source 102 being located directly in front of, directly above, or directly below the remote controller 104a, 104b, 300. Alternatively the remote controller 104a, 104b, 300 may only influence control of light sources identified in a predetermined time interval.

The disclosed subject-matter is applicable in open plan office scenarios where the remote controller 104a, 104b, 300 may be a personal controller of a worker in that office. In this case the increase in sensitivity is on purpose limited in order to only cover the luminaires located close by the office space of the worker when linking the personal control to the luminaires. Thus, according to embodiments the remote controller 104a, 104b, 300 is limited to control a subset of light sources in the plurality of light sources in the coded lighting system 100. For example, the memory 306 of the remote controller 104a, 104b, 300 may only be able to store a predetermined limited number of identifiers. In general terms, the light sources first identified correspond to light sources located close to (or at least having the largest impact on) the remote controller 104a, 104b, 300. It may be advantageous that the remote controller 104a, 104b, 300 is exclusively able to control such closely located light sources. In a typical office scenario a typical work space (or a so-called cubical work station) may only be associated with 2-5 different light sources. Thus it may be advantageous that the remote controller 104a, 104b, 300 simultaneously only can control in the range of, say, 5 light sources. The transmitter 308 may thus be arranged to transmit the further command exclusively in a case the identified light source 102 is comprised in the subset. Alternatively, if an additional light source is detected one of the already stored identifiers may be removed from the memory 306, thereby enabling control of the additional light source. This may be prompted to a user of the remote controller 104a, 104b, 300.

As disclosed above the coded lighting system 100 may comprise more than one remote controller 104a, 104b, 300. Each such remote controller 104a, 104b, 300 may be associated with a specific location or area in the space in which the coded lighting system 100 is provided. For example, each remote controller 104a, 104b, 300 may correspond to a work space or a cubical work station as disclosed above. Since the remote controllers 104a, 104b, 300 may be located relatively close to each other they may be able to identify a common light source 102 (e.g. a light source 102 having substantially the same distance to both remote controllers 104a, 104b, 300). It may therefore be advantageous that the remote controllers 104a, 104b, 300 are able to, by use of the communications interface 312, communicate, in a step 422, information pertaining to identification of light sources to and/or from each other, as schematically denoted by reference numeral 110 in FIG. 1. For example, the distance to the light source 102 (as defined by the received intensity of coded light) may define the ratio of control between the remote controllers 104a, 104b. As noted above, the strength of the received coded light signal may be used to determine the influence the control may have on the respective luminaires. Where close by luminaires with high strength are fully controlled, and those further away with lower strength are only partially under control (e.g. an "On" is interpreted as "50% on" and a full dim-step is only a half dim-step). This is especially practical for open plan office and residential applications, where multiple users may want to influence the same luminaires. For example, if the relative distance between the light source and remote controller 104a is x length units and the relative distance between the light source and remote controller 104b is y length units then the ratio of control between remote controller 104a and remote controller 104b may be set to y/x. In other words, if the relative distance between the light source and remote controller 104a is 4 length units and the relative distance between the light source and remote controller 104b is 6 length units then the relative control of the remote controller 104a is 60% whereas the relative control of the remote controller 104b is 40%.

Figure 5:
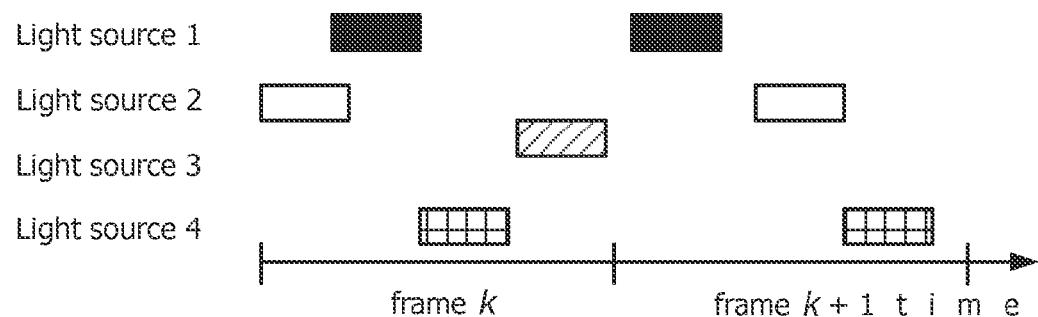
FIG. 5 is an example of light identifier transmission.
Figure 5:
Figure 5:
Figure 5:
Figure 5:

FIG. 5 is an example of light identifier transmission in a system comprising four light sources (in the figure denoted "light source 1", . . . , "light source 4"). In each frame a (not yet identified light source) transmits one identifier packet (in the figure denoted by the rectangular boxes). The light sources utilize the framed ALOHA protocol and the figure shows transmission during two ALOHA frames (in the figure denoted "frame k" and frame "k+1"). As can be seen in the figure, according to this example there is a collision between the identifier packet of light source 1 and the identifier packet of light source 2 in frame k. Thus, in frame k neither light source 1 nor light source 2 may be identified. Out of the remaining two light sources 3 and 4 it is in this example assumed that the identifier of light sources 3 is by the light detector of the remote controller received at a higher intensity level than the identifier of light sources 4. Thus in frame k light source 3 is successfully identified and hence does not transmit an identifier in the next slot (i.e. frame k+1). In frame k+1 there are no collisions and at least the light source of the remaining light sources 1, 2 and 4 received at the highest intensity may be successfully identified.

The person skilled in the art realizes that the present invention by no means is limited to the preferred embodiments described above. On the contrary, many modifications and variations are possible within the scope of the appended claims.

The invention claimed is:

1. A remote controller for commissioning a light source in a coded lighting system comprising a plurality of light sources capable of emitting coded light, comprising:
   a light detector;
   a processing unit coupled to the light detector and arranged to determine an identifier of the light source based on light detected by the light detector, thereby identifying the light source;
   a transmitter arranged to transmit a command to the identified light source to at least partly switch off its light emission; wherein the processing unit is configured to instruct the transmitter to transmit the command in response to identifying the light source, thereby commissioning the light source;
   a variable gain amplifier coupled to the light detector and arranged to increase a sensitivity of the light detector until at least one identifier is detectable in the received light;
   a memory coupled to the processing unit and configured to store identifiers of the plurality of light sources;
   the processing unit configured during determination of the identifier of the light source to compare the identifier of the light source with the stored identifiers of previously identified light sources; and
   the memory and processing unit operable to add the identifier of the identified light source to the memory in response to the identified light source having been identified.

2. The remote controller according to claim 1, wherein the processing unit is further configured to, after instructing the transmitter to transmit the command, determine an identifier of a further light source of the plurality of light sources based on light detected by the light detector after the transmitter has transmitted the command, thereby identifying the further light source.

3. The remote controller according to claim 1, wherein the command comprises information to switch off a modulated part of the light emitted by the identified light source, the modulated part comprising the identifier of the light source.

4. The remote controller according to claim 1, wherein the command comprises information to dim the light emission of the identified light source.

5. The remote controller according to claim 1, wherein the command comprises information to switch off the entire light emission of the identified light source.

6. The remote controller according to claim 1, further comprising a variable gain amplifier coupled to the light detector and arranged to decrease a sensitivity of the light detector until at most one identifier is detectable in the received light.

7. The remote controller according to claim 1, wherein the remote controller is arranged to successively increase the sensitivity of the light detector, thereby enabling the processing unit to successively identify light sources one by one; and wherein the memory is configured to store the identifiers of the successively identified light sources one by one into the memory in response to the successively identified light source having been identified.

8. The remote controller according to claim 1, wherein the transmitter is configured to transmit, to the identified light source, a further command pertaining to control of a light property of the identified light source, wherein an influence of the control is dependent on at least one from a group of an intensity level or an angle of entry of the detected light associated with the identified light source.

9. The remote controller according to claim 8, wherein the transmitter is configured to transmit the further command in a case the intensity level is higher than a predetermined threshold and/or the angle of entry is within a predetermined interval.

10. The remote controller according to claim 8, wherein the remote controller is limited to control a subset of light sources in the plurality of light sources in the coded lighting system; and wherein the transmitter is configured to transmit the further command exclusively in a case the identified light source is comprised in the subset.

11. The remote controller according to claim 1, wherein the processing unit is arranged to determine the identifier of the identified light source by first detecting non-colliding identifier packets of the plurality of light sources within a time frame.

12. The remote controller according to claim 1, further comprising:
a communications interface coupled to the processing unit and, whereby the remote controller is capable of communicating information pertaining to identification of light sources to and/or from at least a second remote controller.

13. A method for commissioning a light source in a coded lighting system, comprising the steps of:
emitting coded light from a plurality of light sources;
detecting light by a remote controller;
determining, by the remote controller, an identifier of the light source based on the detected light, thereby identifying the light source by selectively increasing the sensitivity of a light detector on the remote controller; successively identifying each of the plurality of light sources arranging in a memory of the remote controller each of the plurality of identified light sources; and
transmitting, by the remote controller, a command to the identified light source to at least partly switch off its light emission, wherein the command is transmitted in response to identifying the light source, thereby commissioning the light source.

14. A light source commissioning remote control, comprising:
a light detector coupled to a processor, the processor configured to determine an identifier of a plurality of light sources based on light detected by the light detector;
a transmitter operable to transmit a command to an identified one of the plurality of light sources to at least partly switch off its light emission;
the light detector operable by the processor to vary the sensitivity of the light detector.

* * * * *